Figure 1:
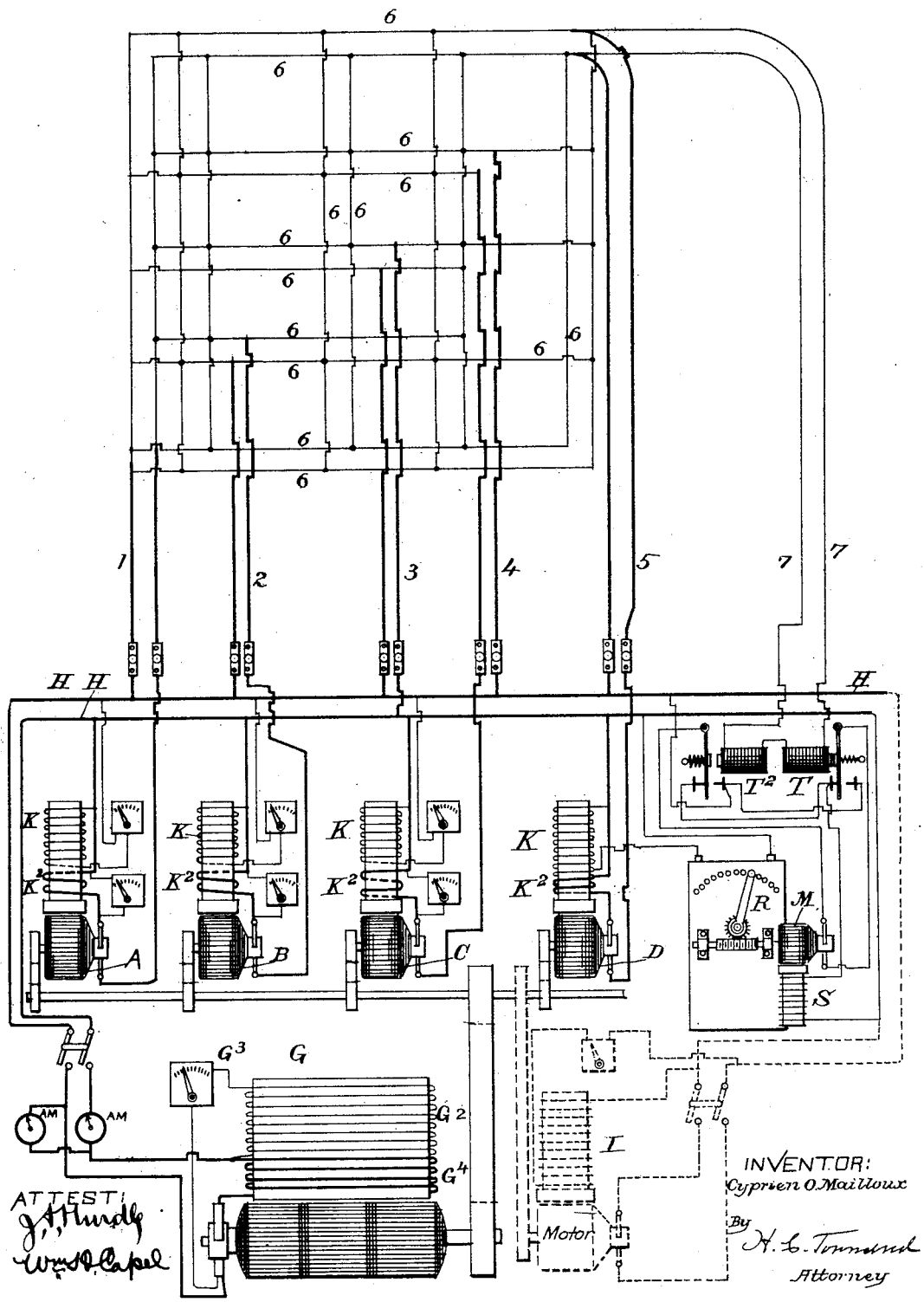

(No Model.)  3 Sheets—Sheet 3.

C. O. MAILLOUX.
SYSTEM OF ELECTRICAL DISTRIBUTION.

No. 475,877.  Patented May 31, 1892.

ATTEST:

INVENTOR:
Cyprien O. Mailloux

By H. C. Townsend
Attorney

UNITED STATES PATENT OFFICE.

CYPRIEN O. MAILLOUX, OF NEW YORK, N. Y.

SYSTEM OF ELECTRICAL DISTRIBUTION.

SPECIFICATION forming part of Letters Patent No. 475,877, dated May 31, 1892.

Application filed November 25, 1891. Serial No. 413,050. (No model.)

*To all whom it may concern:*

Be it known that I, CYPRIEN O. MAILLOUX, a citizen of the United States, and a resident of New York, in the county of New York and State of New York, have invented a certain new and useful System of Electric Distribution, of which the following is a specification.

My invention relates to those systems of electric distribution known as "constant-potential systems," in which different consumption-circuits or different portions of a connected system of consumption-circuits are connected with and supplied by the same generator or generators through feeder wires or circuits. As is well known, it is usual in such a system to obtain a uniformity of potential in consumption-circuits or parts of consumption-circuits at different distances from the central station or having different normal loads by adjusting or determining initially the loss or drop of the several feeder-circuits by their resistance, the feeder-wires for the consumption-circuits or portions of consumption-circuits nearer the central station being given an artificial drop or loss larger than would be necessary if all parts of the system were at the same distance from the central station. In this plan it is obviously necessary that the potential or pressure of the source of supply should be at least equal to that which is necessary for the feeder which connects to the more distant part of the system, and consequently requires the higher potential. In other words, the potential difference at the terminals of the dynamo has to be made as high as is required to compensate for the loss in the feeder of highest resistance. This potential difference is the greater the greater the distance to the point of connection to the consumption-circuit for equal current-loads, and for this reason the shorter feeders must be made of higher resistance than actually necessary, or an artificial resistance must be added to the feeder to cause the drop or loss in potential that will bring the consumption-circuit or portion of circuit supplied by said feeder to practically the same potential as the parts supplied by the longer feeder. It is also necessary in such a system to provide for an adjustment of the resistance in the feeder-wires in accordance with variations of the current-load in them. It will be obvious that in a system of this kind a certain percentage of energy is necessarily wasted in heating resistance. Moreover, since this enforced loss increases with the radius of territory or area covered by the consumption system, owing to a greater excess of potential being needed to supply the desired potential difference or pressure at the more distant point, it follows that a limit is soon reached commercially in the area of territory that can be profitably operated from a single source of supply.

One of the objects of my invention is to provide for the control and regulation of the electric pressure at the different parts of the system of consumption-circuits in a reliable and effective manner without loss of efficiency, and, further, to extend the area of commercial usefulness of the present sources of supply, as well as to increase the economy with which such systems may be generally operated. It is also well known that under the present systems of operation the degree of difference permissible in the normal loads of different consumption-circuits or portions of consumption-circuits supplied by feed-wires from a generator or generators of given potential soon reaches a practical economical limit, owing to the fact that it is necessary to make the feed-wire of the lightly-loaded portion of the system of greater total resistance than the more-heavily-loaded part in order to have the same drop or greater loss in the feed-wire of the lightly-loaded portion of the system as in the feed-wire of the more-heavily-loaded portion, so that the resultant potential or pressure of the consumption-circuits may be of the normal or proper amount.

Another object of my invention is to admit a greater disparity in the normal loads of different portions of the system without undue losses, as well as to remove the loss due (in the present systems) to the use of a feeder-wire having in itself (or by an artificially-interposed resistance) a higher resistance for the lightly-loaded portion of the system in order to bring down the potential of its consumption-circuit to normal. Hence, also, by my invention consumption-circuits already loaded to the limit of economy in the use of copper for the feeders may have their load increased without change in the feed-wires or undue losses in consequence of raising the whole station-potential; or feed-wires having less copper than is now employed could be used for the more-heavily-loaded portion of the system.

My invention consists, essentially, in adding to or subtracting from the drop or loss in one or more of the feed-wires or conductors which supply the consumption-circuits of the system by using a supplemental or electro-motive-force generator in the circuit of said feeder and adjusted and applied to produce with normal load an effect assisting or opposing the electro-motive force of the main generator in proper degree to give a resultant drop on said feeder such as is required to secure the desired relation of potentials or pressure on the different consumption-circuits or portions of consumption-circuits. If it is desired to add to the drop upon the feeder-circuit, the supplemental source of electro-motive force is connected into such feeder-circuit and operated so as to set up an electro-motive force counter to that of the main source of supply. If it is desired to subtract from the drop in the feeder in which the supplementing action is to be produced, the said electro-motive-force generator is applied and operated in a manner to assist that of the main source. As an electro-motive-force generator for this purpose I employ, by preference, an electro-dynamic machine the armature of which is run in the feeder-circuit either as a motor or as a generator, according to the effect desired. When run to increase the drop in the feeder-wire, it has its magnetic field excited, so that it will operate as a motor, thereby giving rise to a counter electro-motive force, which will reduce the initial electro-motive force. This counter electro-motive force may be varied in any well-known way, either for the purpose of an initial adjustment to the normal load on the consumption-circuit or for variations of load by varying the strength of the magnetic field or by varying the speed of the motor, or in any other well-known way. If, on the other hand, the armature of the electro-dynamic machine is to operate to decrease the drop on the feeder wire or circuit, it is then run as a generator whose electro-motive force supplements that of the main source, its effect or action being regulated to produce the desired initial effect or to change the effect with variations of load in any suitable manner. When it is thus operated, it may be driven by any suitable power derived from any prime mover—as, for instance, from that employed to drive the main generator, which supplies all of the feeder-circuits of the system—either directly by being belted or mechanically connected to the prime mover, or indirectly through the energy of an electric motor, which may be driven by current supplied from the main generator.

In carrying out my invention where only two feeder-wires are employed for the different consumption-circuits or portions of consumption-circuit the supplemental electro-motive-force generator may be run in either of said feeder-circuits or each feeder-circuit may have such a supplemental electro-motive-force generator. It is also possible to run all of the supplemental generators of the system as motor-armatures or as generators assisting the electro-motive force of the main source of supply, or some may be run as motors and some as generators. The motor-armatures are preferably belted or geared or otherwise connected with the supplemental assisting-generators or with the main generator, so that the energy consumed in the motors may be utilized in operating the generators, thereby effecting a great saving in the total power consumed. The connection of the motor armature or armatures so that the energy absorbed therein may be reconverted into energy or power that will drive the main dynamo may be effected by the mechanical connection of said revolving armatures with the main dynamo; or, if desired, the supplemental armatures, run partly as motors and partly as generators, may be connected together and driven from a motor which is itself driven by electric energy supplied from the main generator or from the bars or wires to which the feeder-wires are connected. Where a number of supplemental armatures are used for the feeder-circuits, they may be placed separately in said feeders, or the feeder-wires may be tapped into a series circuit of the supplemental armatures, so that the feeder circuit or conductor in which a greater variation of drop is to be artificially produced shall be connected with the main generator through a number of supplemental armatures, while those in which a less drop is to be produced shall find circuit through a less number of such armatures in series.

One advantage of my improved system of distribution is that the loss by resistance in the feeders need not be the same on the whole area lighted or supplied, but can be varied according to the requirements of economy. The portions near the source of supply can be operated with a small drop or loss by resistance in the feeder-wire, while the feeders supplying the outlying districts could be allowed a higher percentage of loss than is now allowed. In other words, by my system the losses near to the source of supply are avoided and the energy saved may be employed in extending the area of distribution.

My invention consists, further, in the combinations of apparatus and circuits hereinafter described, and more particularly specified in the claims.

Figure 2:
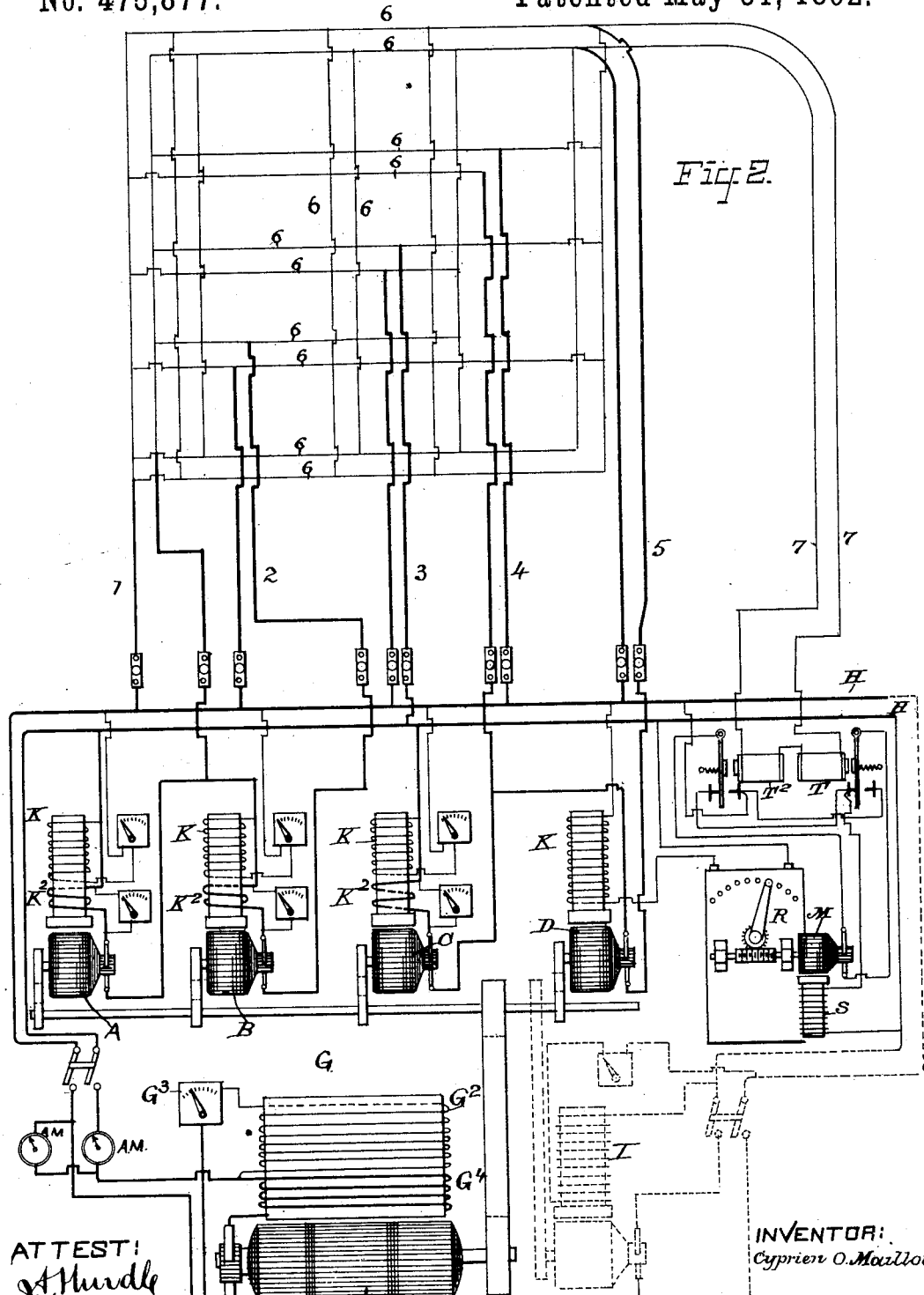
Figure 3:
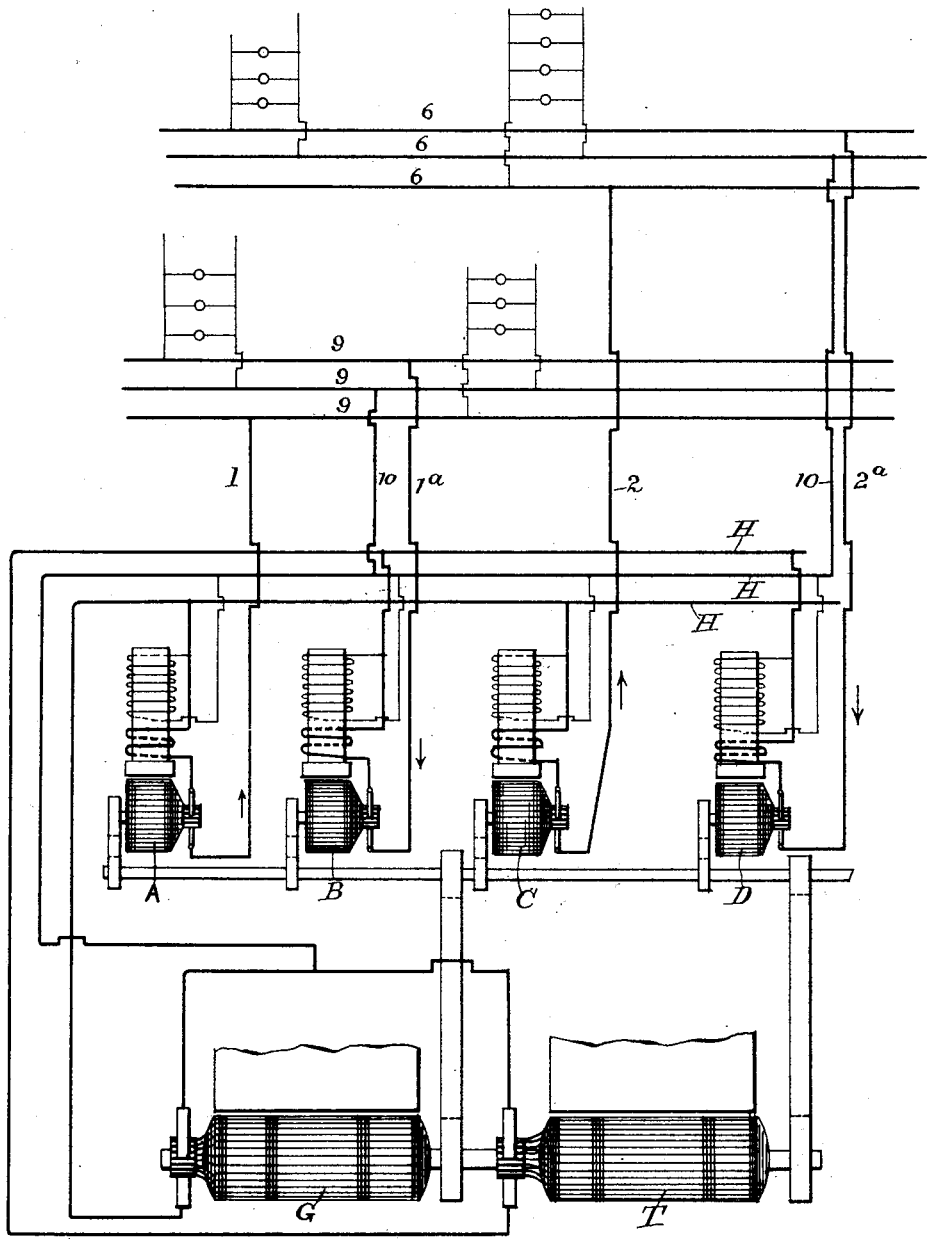

Figure 1 is a diagram of a system and apparatus organized in accordance with my invention. Fig. 2 illustrates a modification in the arrangement of the supplemental electro-motive-force generators with relation to the feeder wires or conductors. Fig. 3 illustrates the application of the invention to the three-wire system.

The consumption circuit or circuits of a constant-potential system of distribution are indicated by the numerals 6 6. The circuits may be connected into a common net-work, as shown, or they may be separate or independent circuits normally disconnected from one another, but supplied with energy from the feed-wires connecting them with the sources of supply.

I have illustrated my invention as applied to a system in which five feeders (indicated by the numerals 1 to 5, inclusive) are employed, which feeders are supposed to be connected to consumption-circuits or portions of circuit at different distances from the general sources of supply or to consumption-circuits or portions of circuit having normally-different loads.

While I have shown five feeder-circuits, it is within my invention to employ a greater or less number. They are connected as branches to the same general source or sources of energy, which are constructed in the usual manner to furnish at their terminals an approximately constant difference of potential or a difference of potential which shall rise with the load to keep a constant difference upon the bus-bars or upon the general system. In the present instance I have shown the general source of supply as consisting of a generator G, which is compounded in any proper or usual manner with a constant exciting source and a variable source, by which it may be, if desired, overcompounded to compensate for the variations of loss in the circuits between it and the translating devices in consequence of variations in the load. The ordinary type of generator, as herein illustrated, comprises, as is well known, a field-magnet having coils $G^2$, excited in shunt to the general circuit from the armature and including a variable-resistance device or rheostat $G^3$ and main-circuit coils $G^4$, placed in the main circuit with the armature and the work. This machine is connected, as shown, to the usual bus-bars H, and associated with it are the usual switches, ammeters, and voltmeters, as indicated. The several feeder-wires 1 2 3 4 5 are connected with said bus-bars in the ordinary way.

A B C D are the supplemental electro-motive-force generators, which in the present instance are shown as consisting of the armatures of electro-dynamic machines, which are belted or otherwise connected with any suitable driving-power, preferably with the driving-power of the generator G, through suitable shafts and belting or other mechanism. They are by the same mechanism interconnected with one another, so that those armatures which operate as motor-armatures may act upon those which operate as generator-armatures in the manner of a driving-power. The several armatures or electro-motive-force generators A B C D might be driven from the same general driving-power, as G, through the intervention of an electric motor, (indicated at I,) which motor obtains its driving energy from connection with the bus-bars, as shown, and has its armature-shaft belted or geared to the shaft to which the armatures A B C D are connected.

In the diagram Fig. 1 the feeder 1 is supposed to be connected to a nearer consumption-circuit or portion of consumption-circuit and the feeders 2 3 4 5 to be connected in regular order to consumption-circuits or portions of consumption-circuit more remote; but as will hereinafter be made more apparent the said feeders might feed consumption-circuits having normally-different loads.

Each armature A B C D may be run either as a motor by the current circulating in the feed-wire or may be operated as a generator, as before explained. Each operates in a suitable magnetic field, shown therein as provided with suitable means whereby its strength may be adjusted to produce the required initial voltage in each armature or to compensate for changes in the load on the feeder of each armature. For this purpose the field-magnet of each may be wound with two coils, as indicated in Fig. 1 of the diagram, one of the coils K being traversed by a constant current obtained from any suitable source—as, for instance, from the bus-bars—while the other $K^2$ is a main-circuit coil and is in the main circuit with the armature, so as to be traversed by the current circulating over the feeder. Suitable means may be employed for regulating or adjusting the flow of current in the said coil—as, for instance, rheostats included for the coil K in the direct circuit thereof and for the coil $K^2$ in a shunt around said coil; but any other suitable means may be employed for adjusting or regulating the action of said coils. The coil K, as will be well understood by electricians, should be adjusted to give the required initial voltage necessary to cause the armature A to act to the desired extent in determining the drop upon the feeder. The main-circuit coil $K^2$ serves as a means for automatically compensating for the variations of loss in the feeder due to variations in the load, and it operates as any compounding coil. In case the armature is run to give an assisting electro-motive force to that of the main generators the coil $K^2$ is applied to assist coil K and raise the electro-motive force of the armature with increase of current-load in the feeder. If, on the contrary, the armature runs as a counter-electro-motive-force generator—that is, as a motor—the coil $K^2$ is applied to tend to cut down the field-magnetism as in any compound-wound motor, the effect being to decrease the electro-motive force of the armature on increase of the current-load. As will be obvious, the main machine cannot adapt itself to all the circuits individually, the losses in which would be naturally different for circuits of different voltages or because of variations in the load and of the drop in one feeder independently of the other; but each electro-dynamic machine in the feeders being provided with independent means for varying its effect automatically, according to variations of load on said feeder, it may take care of the losses in said feeders not provided for in the main dynamo or source.

Instead of using a main-circuit compounding-coil $K^2$ for automatically compensating for variations of load on the feeders individually I may use the automatic appliance indicated as attached to the field of the armature D and which will be presently described.

In the arrangement shown in the diagram the armatures A B may operate as counter-electro-motive-force generators, which tend to increase the drop in the feeders 1 2, while the armatures C D are driven as ordinary dynamo-generators, so as to assist the potential of the main sources upon the feeders 4 5. The said armatures A B C D being all connected together, the motive effects produced in the armatures A B will serve to assist in operating the generator-armatures C D. The feeder-wire 1, being that which is connected to the nearer point of the consumption-circuits, has its armature adjusted to give an opposing effect that will tend to produce a greater drop in said feeder than is produced by the armature B in the feeder 2. The armatures C D, which run in a manner to reinforce the potential required from the main generator, operate each in a manner to tend to decrease the total drop on the feeders 4 5; but the armature D operates with a greater effect than C. The drop on feeder 3 is determined solely by the resistance of said feeder-wire, which feeder is connected directly to the two bus-bars, as shown. In each case the adjustment of the electro-motive-force effect of the armature is such that the resultant total drop in its feeder, due to the resistance of the feeder-wire combined with the effect of said armature, shall give the desired relation of pressure at the points of connection to the consumption-circuits. In the case supposed of consumption-circuits feeding-in constant potential with substantially the same load over the whole system the effect, say, of the armature A in increasing the drop of the feeder-wire 1 would be such that the pressure at the point of connection of said feeder-wire to the consumption-circuits would be the same as the normal pressure produced at its point of connection by the feeder-wire 3, which has the potential of the bus-bars alone. The feeder-wire 2, which connects with a part of the system a little farther removed than 1 and which would, therefore, have supposedly a greater drop, owing to the resistance of the conductor, would have its armature B adjusted to produce a counter effect less than A, so that the resultant total drop in said feeder-wire would be the same as in 1. So in the case of feeder-wires 4 5, the assisting potential of the electro-motive-force generator is in each case normally such as to reduce the drop due in said feeders to resistance and bring the pressure at the terminals of said feeders, where they connect to the consumption-circuit, up to normal.

Instead of operating the armatures C D as assisting electro-motive-force generators they might be operated in the same way as armatures A B—that is to say, as counter-electro-motive-force generators, tending to increase the drop in their feeder-wires. In such case it would be desirable to connect that feeder-wire which supplies the more remote portion of the system, or the portion having the greater load, directly to the bus-wires, or, in other words, to place the armatures C D in the feed-wires 3 4 and connect feed-wires 5 directly to the bus-bars in the same way that 3 is shown connected. In this case the armature D would have the least counter effect in tending to increase the drop on its feeder-wire, and the effects of C B A would be, in turn, greater in the order named. All of the energy consumed in driving said armatures would be, when they are all belted to the main generator, returned to the general driving power of the central station and would not be lost, as is the case when artificial resistances heated by the current are used for determining the relative drop in the feed-wires. If the armatures A B C D were all driven as generators having an assisting electro-motive force, then the feeder-wire which is connected directly to the bus-bar would be that which feeds the nearer portion of the system or consumption-circuits, or that which has the less load, and the armatures A B C D would, in the way named, have each a higher potential than the preceding one of the series, so as to tend to lessen the resultant drop on its feed-wire. The adjustment of the relative effect upon the drop desired would be determined, as already explained, by the adjustment of the current in the coil K or by other means. The automatic adjustment for variations of current-load on each feeder would be produced by the coil $K^2$.

For the purpose of explaining the nature of my invention more fully I will first explain more in detail some of the variations of the conditions that may exist in the cases of its application to the feeder-wires which are required to supply consumption-circuits or portions of consumption-circuit at different distances from the main source. Taking for this case feeder-wires 2 and 3, of which 3 is the one supplying the more distant portion of the system, it is obvious that the pressure on the consumption-circuit connected to 3 will depend upon the drop or loss in said wire 3, which in turn is dependent upon the length of said feeder and the size of the feeder-wire. The drop or loss permissible in said feeder being determined, it is necessary that the same total drop should exist in the feeder 2 in order that the same potential or pressure should exist at the portion of the consumption-circuit supplied by 2. This may be effected by running the armature in said feeder as a motor and adjusting it to give a counter electro-motive force, which adds to the drop due to the resistance of said feeder, so that the resultant drop due to the resistance, plus the counter electro-motive force in 2, shall be the same as the drop in 3 due to resistance. If the energy used in developing this counter electro-motive force is converted into driving-power running the main generator in accordance with my invention, it is obvious that the gage of feeder 3 might be less than would be otherwise required, or that said feeder might supply a part of the system relatively more remote and still feed into the consumption-circuit the same potential.

Instead of using a motor-armature acting to increase the drop of the feeder 2 alone a similar armature, but differently adjusted, might be run in combination with it in the feeder 3. In this case the motor-armatures would obviously have to act with a difference of effect dependent upon the differences in the losses or drop due to resistance of the feeder-conductors and the feeder 3 would have to feed a portion of the system nearer the source, or else the gage of the conductor in the feeder would have to be increased so that the total drop therein might be the same. This would be true, also, of the feeder 2, which would now have to have a counter electro-motive-force armature having an effect to increase the drop relatively greater on account of the opposing effect of the armature in the feeder 3, or else its feeder-wire would have to be of larger gage to compensate for such increased effect. In this instance it is obvious, as before, that the resultant drop in the feeders, due to the counter electro-motive force plus the natural resistance of the feeder itself could be made the same, so that each feeder should feed into the consumption-circuit the same potential or pressure of electric energy. The practical condition would be ordinarily one wherein the two feeders would be connected to points of the system that are nearer to the source, and the condition is found in the figures of the drawings in the two feeders 1 2.

Taking now the case of the feeders 3 4, the latter of which is required to feed a more distant part of the system, it is obvious that the same total resultant drop might be produced in both by running a generator-armature in the feeder connected to the more distant portions of the system, so as to assist the applied potential, and thereby decrease the total resultant drop therein. Here the total drop in the conductor 4 would be that due to its resistance minus the supplementing action of the generator or tendency thereof to raise the potential at the end of the feeder, and when the drop in the feeder 3 is that due only to the resistance of its wire or conductor and the said conductor is connected to a near point of the system and has but little natural drop. The same drop in both the feeders may be secured, not by giving an artificial resistance to 3, but by supplementing the potential of 4, the effect being that the potential at the end of the feeder 4 is brought up to that at the end of the feeder 3. Therefore the feeder 4 may be of smaller gage wire or may be of the same gage wire and be used to feed a more distant part of the system, while the energy heretofore consumed in heating the resistance in the feeder 3 is saved and may be employed in running the generator, which will raise the potential on the feeder 4 and enable the same feeder-wire to produce the same pressure at a more distant point. It will be obvious that the feeder 3 might also have a generator assisting the applied potential, but in less degree than the assisting armature in the feeder 4, and still produce the same resultant or total drop in both feeders, so that the pressures at the end connected to the consumption-circuit should be the same. In this case the two feeders might supply points relatively more distant than the same feeders where one only of them contains the generator. This condition is exemplified in the figures of the drawings in the case of the feeders 4 and 5.

Another condition exists in the case of the two feeders 2 and 4, which supply points of the system whose distances from the main generator are relatively of a greater difference than those supplied by feeders 3 and 4. In this instance the one feeder which supplies the more distant point may have a generator, which tends to reduce the drop on said feeder, while the other may have an armature run as a motor, which tends to increase the drop in its feeder. As will be obvious, the total resultant drop may be made the same on both by properly adjusting the effects of said armatures. In the one case—to wit, in that of the feeder 4—the total drop will be the resultant of the comparatively large resistance of copper conductor diminished by the reinforcing-potential or electro-motive force of the generator, while in the case of the feeder 2 the same resultant drop will be effected by adding the counter electro-motive force, which increases the natural drop due to the resistance to the small resistance of copper in the feeder-wire. The supplementing or compensating action of motor and generator armatures placed, respectively, in the feeder-wires would obviously be greater in the case of feeders which supply parts of the system the difference in whose distances from the central station is still greater—as, for instance the feeders 1 5. My invention, it will be obvious, is therefore capable of realization in the case of a system where two feeders only are used by running an armature in both of said feeders, both of said armatures being motors or both generators, or one a motor and the other a generator. It is further obvious that in the case of two feeders the same compensating action for producing the proper drop on the feeders might be obtained by using the motor-armature in one of them only, or a generator-armature in one of them only.

In the case of two feed-wires, as well as in the case of a larger number arranged as shown in the drawings, the energy consumed in the motor-armature in developing the counter electro-motive force which tends to produce an increase of the drop could be employed as converted mechanical power in driving the supplemental-generator armatures, which operate in other feeder-wires in a manner to decrease the drop. If motor-armatures only were employed in the feeder wire or wires, the power of such armatures could be employed in driving the main generator. Substantially the same variation of condition and of arrangement would obviously exist in the case of feeders feeding parts of a system having different normal load whether such parts were at different or at the same distances from the central station. Assuming feeder-wires in question to be two in number and to supply consumption-circuits having different normal loads but at the same distance from the central station, it is obvious that if the feeders were of the same resistance, and that for the consumption-circuit having the greater load had the proper drop, that for the lighter load would have too little drop. The remedy for this has heretofore been to make the resistance of the more-lightly-loaded feeder greater in order to bring down the pressure at the comsumption-circuit supplied by it to normal. If the wires themselves were of the same resistance, artificial resistance would have to be inserted.

According to my invention a supplemental electro-motive-force generator, opposing or assisting, would be put into one or both feeders and made to have an effect, assisting or diminishing the drop of the feeders to such extent that the total resultant drop in the two feeders in question would be of the proper amount or relation in said feeders to give the required pressure in the consumption-circuits. It could be applied as a counter electro-motive force in the more-lightly-loaded feeder alone, so as to increase the total drop and for bringing the pressure down to the required amount in the consumption-circuit, or it could be applied in the same way in both feeders but in proper relative amount to give the required resultant relative drop in said feeders; or the generator-armature could be used in the feeder having the greater load to raise the potential and tend to decrease the drop therein. In this case the wasteful resistance heretofore used in the feeder for the more-lightly-loaded portions of the system could be omitted, a feeder of higher resistance than usual for the heavily-loaded feeder could be employed, and the drop brought down to the required amount by the assisting potential of the electro-motive-force generator. It would therefore, also, be practicable to increase the disparity in the normal loads of the two feeders, since the same feeder-conductors could be employed and the diminished loss required for the greater load be provided for by the assisting electro-motive force in the feeder connected to the more-highly-loaded consumption-circuit; or, on the contrary, the loss could be increased in the other feeder by a counter-electro-motive-force generator and a less load be efficiently run thereon, the motive power of such generator being used to run a generator assisting or tending to raise the potential of the system.

From what has already been said it will be obvious that the required relative drop in the two feeders supplying normally-different loads could be also obtained by differentiating the effects of a motor and generator armature in said feeder-conductor, respectively.

Instead of using a main compounding-coil alone for adjusting automatically the effects of the electro-motive-force generators upon the feeders I might use in addition thereto an automatic arrangement, such as illustrated in connection with the armature D, wherein I have shown supplemental means for adjusting the action of the electro-motive-force generator in the feeder, said means being ordinarily controlled by a relay or magnet, connected by pressure-wires directly to the consumption circuit where it is desired to maintain the adjusted potential. Such means for adjusting the action of the generator is conveniently a field-magnet coil applied to the field-magnet and operating to increase or decrease the magnetism, as required.

While I prefer to employ an electro-motive-force generator in which a main circuit coil on the field-magnet and in the feeder-circuit is combined with supplemental means for adjusting the field magnetism, responsive directly to variations of pressure communicated through pressure-wires, it would be possible to employ the same automatic regulation by the pressure-wire alone, the main coil $A^2$ being in this instance omitted. This variation I have illustrated in the case of the supplemental generator D in Fig. 2 of the drawings.

The means responsive to variations on a pressure-wire is conveniently a coil K on the field-magnet, in which coil variations of effect may be produced by a resistance or otherwise. Thus, for instance, the coil K may have its effects automatically varied by the action of a rheostat the arm of which (indicated at R) is automatically controlled in its movements by any suitable mechanism, that in turn is controlled in its operation by an electro magnet or magnets in a pressure-wire 7, which connects with the point of the consumption-circuits where the feeder-wire 5, in which the armature D is located, connect, so that variations of pressure at such point due to variations of load will operate the relays and produce a corresponding movement of the arm R. When the armature D is operated as an assisting generator, the parts are so combined that the movement of the arm R will be in a direction to increase the effective field on an increase of load at the point of connection of the feeder-circuit to the consumption-circuit. On the other hand, if the armature D were operated as a motor-armature, tending to increase the drop of the feeder-wire, the contrary effect would be produced—that is to say, the field should be decreased on an increase of the load. By using these combined devices for regulation it will be obvious that the variations of load which are not taken care of by the main-circuit coil $K^2$, either by reason of the sluggishness of the apparatus or because of their great percentage of the maximum load, may be taken care of by means of the coil K, which is directly responsive to the changes of pressure at the point of connection of the feeder-wire 5 to the general distribution system.

The mechanism for controlling the movement of the resistance-arm consists of an electric motor the armature M of which is connected through a worm-screw with the spindle of the rheostat-arm. The direction of movement of said armature is determined by reversing the direction of current in the armature, which is placed in circuit with the field-magnet coils S. One terminal of the field-magnet coil is connected to one of the bus-bars H, as indicated. The other terminal of said coil connects with the front contact of a relay T in the pressure-wire and also with the back contact of a relay $T^2$ in said pressure-wire. The back contact of relay T and the front contact of relay $T^2$ connect to the opposite bus-bar from that to which the field-magnet connects directly. The two terminals of the armature itself are taken to the relay-armature levers, as shown. The retractors of these levers are so adjusted that with the normal pressure the effect of the magnet $T^2$ would be insufficient to hold up its armature-lever against the front stop, while in the case of the armature-lever of T the retractor will be overcome by the effects of such normal pressure. A certain margin of adjustment may be provided, so that an increase or a decrease of pressure is required to a determinate degree in order to produce any movement of the armature-levers, and hence there may be variations within certain limits without any movement of the rheostat-arm R.

The condition of things during the normal pressure is indicated in the drawings. Starting from the lower bus-bar, the circuit for the motor will be found to be broken at the front contact of $T^2$ and the back contact of T, and the motor will therefore remain at rest. If the pressure falls, the relay-armature of T will drop back and close circuit, and the circuit will then be through the motor, starting from the upper bus-bar by way of said back contact and the armature-lever of T, through the armature of the motor to the back contact of $T^2$, thence to the field-magnet, and to the opposite bus-bar, and the motor will then operate the rheostat-arm in such way as to cause the electro-motive-force generator D to decrease the total drop on the feeder 5 and restore the pressure of the consumption-circuit to normal. As soon as this restoration has been effected the armature-lever of T will be drawn up and the parts resume their normal position and the motor come to rest. If the pressure should increase beyond the adjusted amount, the armature-lever of $T^2$ will be drawn up, thereby closing the circuit on its front contact, which is connected directly to the upper bus-bars, the armature-lever of T retaining, of course, its position. The circuit will now be through the armature of the motor in the opposite direction, starting from the upper bus-bar T, through the front contact of the relay $T^2$, armature-lever thereof, armature of motor to armature of relay T, front contact of the latter, and through the field-magnet of the motor to the opposite bus-bar. The motor now reverses its movement and the arm R moves in the opposite direction, so that the supplemental electro-motive-force generator D will operate in the feeder-wire so as to increase the total drop on said feeder-wire and cause the pressure to be restored to normal. When this occurs, the armature-lever of $T^2$ will drop back and the circuit of the motor will be broken and the arm R cease to move.

The several supplemental electro-motive-force generators, instead of being arranged in the manner shown in Fig. 1, might obviously be arranged as shown in Fig. 2. In this case the armature of B is connected into series circuit with armature A, the feeder 1 being tapped to the point of connection, while the feeder 2 is connected to the terminal of the series of two armatures A B. The effect of B is therefore added to that of A in the feeder 2, while feeder 1 feels the influence of A alone. In the same way armatures C D might be connected together. It is obvious that this modification in the arrangements does not change the general operation of the devices; but it is possible in such case to employ for the armature B or the armature D a smaller armature than is necessary in the first-described arrangement, since the effect to be obtained therefrom is only equivalent to the difference between the effects required in the circuits 1 2, while in the former arrangement the effect of B must be produced without the reinforcing influence of A. It is, however, necessary in this case that the armature A should be constructed with reference to its being compelled to carry the combined currents for the feeders 1 2. The arrangement is also not so desirable because it does not permit the same independence of automatic regulation of the drop by the armatures.

Fig. 3 illustrates the application of my invention to a three-wire system. In this case I have omitted some of the auxiliary devices shown in the other figures of the drawings for the sake of simplicity. The two generators, which are run in series with one another and are connected at an intermediate point to the middle bus-wire, are indicated by the letters G T. The consumption-circuits of a part of the system more remote from the central station are indicated at 6 and the consumption-circuits nearer to the station, or having a different normal load, by the wires 9 9. Supplemental generator A and feed-wire 1 connect to one side of the three-wire consumption-circuits 9 and supplemental generator B in the feed-wire 1ª connects to the opposite side of the system of consumption-circuits, and the neutral conductor 10, connected to the intermediate wire, connects, as shown, to the intermediate bus-bar in the obvious and well-known way. Similarly the consumption-circuits 6 are fed through the feeder-wires 2 and 2ª, in which are placed the supplemental generators C D, 10 being the neutral conductor, connected to an intermediate wire 6 of the three-wire consumption-circuit.

The armatures A B, as before explained, might be both run as generators or both as motors and would each be normally adjusted with relation to the resultant drop desired in each feeder-wire 1 or 1ª, or with relation to the difference in the normal load on the two sides of the three-wire system 9. Armatures C D would be adjusted with relation to the resultant drop desired in the feeder-wires connected to the more-distant or more-heavily-loaded part of the general system 6. Armatures A B might be run as motor-armatures, giving a counter electro-motive force, while armatures C D are run as generator-armatures, giving an assisting counter electro-motive force to the main generators, or vice versa; or all might be run as motor-armatures, or all as generator-armatures.

While I have shown consumption-circuits 6 and 9 as separate or independent, it is obvious that they might be parts of a connected system of consumption-circuits, as already explained.

What I claim as my invention is—

1. In a system of electric distribution, the combination, with the consumption circuit or circuits and the feeder wires or conductors connected to the various points thereof and over which the said consumption circuit or circuits are supplied while the load is normal from a suitable main-supply source or sources of energy, of a supplemental or auxiliary electro-motive-force generator or generators in the feeder wire or wires and in the direct circuit of the main source of supply between the same and the consumption-circuit, and operating normally or at full load with an electro-motive force, counter or assisting, and adjusted with respect to the relative drop in the feed wires or conductors to produce at full load a resultant drop necessary for the pressure or potential desired at the points of connection to the consumption circuit or circuits.

2. The combination, in a system of electric distribution, of a consumption circuit or circuits, a main-supply generator or generators from which said circuits derive their main or normal supply of energy, feed wires or conductors connecting the consumption circuit or circuits of parts of the system at different distances from the main generator or parts having normally-different loads, and a supplemental electro-dynamic machine or machines having armatures in said feeder-wire circuit or circuits between the main-supply generator and a consumption-circuit and normally adjusted, and applied in the manner described to oppose or assist the electro-motive force of the main machine, as and for the purpose described.

3. The combination, in a system of electric distribution, of the consumption circuit or circuits, feed wires or conductors leading to different parts thereof from a common source, and a supplemental or auxiliary electro-motive-force generator or generators included in said feeder-wires and having a normal action at full load adjusted with respect to the relative drop in said feeders, as and for the purpose described.

4. In a system of electric distribution, the combination, with the consumption circuit or circuits, of feeder-wires over which the consumption-currents are supplied, having a greater normal drop or loss for the portions of the system more remote from the source of supply or having a normally-less load and a less drop for the portions nearer to the source of supply or having a greater load, and a supplemental source of electro-motive force in the circuit of a feeder-wire and adjusted in the manner described with respect to the differences in the loss on the feeders, so as to produce on the consumption-circuits the required normal relation of potential at the points of connection with the feeder-circuits.

5. The combination, in a system of electric distribution, of a consumption circuit or circuits, feeder-wires over which the consumption-currents are supplied, having a greater normal resistance drop or loss for the portions of the system more remote from the source of supply and a less drop for the portions nearer to the source, and a supplemental assisting electro-motive-force generator in the feeder-wire connected to the more distant portion of the system, as and for the purpose described.

6. The combination, in a system of electric distribution, of a consumption circuit or circuits, feeder-wires over which the said consumption circuit or circuits are supplied when the load is normal from a suitable source or sources of energy, a supplemental electro-dynamic machine or machines having armatures operating either as motors or generators and included individually in the circuits of said feeder-wires, as and for the purpose described.

7. The combination, in a system of electric distribution, of a consumption circuit or circuits, feeder-wires connecting the same with a suitable source or sources of supply from which said consumption-circuits derive their energy when the distribution of load is normal, and an electro-dynamic armature operated as an electric-motor armature in the direct circuit of a feeder-wire between the normal source of supply and the consumption-circuit, and furnishing driving-power to assist in operating a generator armature or armatures normally supplying electric energy tending to supplement the potential of the normal or main source, as and for the purpose described.

8. The combination, substantially as described, in a constant-potential system of electric distribution, of a consumption circuit or circuits, feeder wires or conductors connected to different parts of the same, a generator or generators common to said feeder-wires and adapted to maintain the required difference of potential at the common terminals of the feeder-wires, and electro-dynamic armatures included individually in feeder-wires of the system and each provided with means for automatically adjusting its power according to the variations of load on its own feeder-wire.

9. The combination, in a system of electric distribution, of the consumption-circuits, the feeder-wires connecting the same with a common source of energy, and electro-dynamic armatures placed individually in the feeder-wires and operating either as motor or generator armatures, each of said machines being provided with means for automatically adjusting its field in accordance with changes of load of its own feeder.

10. The combination, in a system of electric distribution, of the consumption circuit or circuits, feeder wires or conductors connecting the same with a suitable source of energy, a supplemental electro-motive-force generator placed in a feeder-wire and normally adjusted with respect to the relation of drop between itself and another feeder due to a resistance, and means for automatically changing its electro-motive-force capacity according to the variations of load at a part of the consumption circuit or circuits.

11. In a system of electric distribution, the combination of the consumption circuit or circuits and the feeder wires or conductors connecting the same with a common source of electric energy, and one or more supplemental armatures placed individually in the feeder-circuits and having field-magnet coils traversed, respectively, by an approximately constant current and by the current flowing over the feed-wire and through the armatures, as and for the purpose described.

12. The combination, in a system of electric distribution, of the consumption circuit or circuits, feed wires or conductors connecting the same with a common source of energy, and electro-dynamic armatures connected into said feeder-circuits and part operating as motors and part as generators, said motor-armatures furnishing driving-power to assist in operating the generator-armatures.

13. The combination, substantially as described, in a system of electric distribution, of the consumption circuit or circuits, the feeding wires or conductors connected with a common source of energy, and electro-dynamic machines having their armatures included in the feeder wires or circuits and adjusted, as described, to supply an electro-motive force assisting or opposing the main electro-motive force and in accordance with the drop required in the feeder-wires, said armatures and the main generator being interconnected, as described, so that the energy absorbed in the armatures opposing the main electro-motive force and converted into motive power therein will tend to drive the supplemental-generator armatures, as and for the purpose described.

14. In a system of electric distribution, the combination, substantially as described, of the feeder wires or conductors connected to constant-potential circuits, a source or sources of energy common to said feeders and from which they branch separately, and supplemental electro-motive-force generators in said feeder branches and each provided with means for automatically adjusting its potential in accordance with changes of load on its own feeder independently of the changes on other feeders.

15. The combination, in a system of electric distribution, of an electro-dynamic armature operating as a supplemental electro-motive-force generator and placed in a feeder-wire between the main generator and the consumption-circuit, a field-magnet therefor, having a main circuit coil in the feeder-wire, an independent field-magnet coil, and a controlling magnet or magnets for adjusting the effect of said independent coil, said magnet or magnets being in a pressure-wire connected to the consumption-circuit at or near the point where the feeder-wire is attached.

Signed at New York, in the county of New York and State of New York, this 24th day of November, A. D. 1891.

CYPRIEN O. MAILLOUX.

Witnesses:
WM. H. CAPEL,
THOS. F. CONREY.